United States Patent [19]
McRae

[11] Patent Number: 6,115,079
[45] Date of Patent: Sep. 5, 2000

[54] PROGRAMMABLE VIDEO CHANNEL CONTROLLER

[76] Inventor: Michael W. McRae, 273 Lilac Cir., Louisville, Colo. 80027

[21] Appl. No.: 09/023,998

[22] Filed: Feb. 14, 1998

[51] Int. Cl.[7] .............................. H04N 7/16; H04N 5/44
[52] U.S. Cl. ........................... 348/731; 348/5.5; 348/10; 348/553; 455/6.2
[58] Field of Search .............................. 348/10, 553, 5.5, 348/725, 728, 731; 455/6.2

[56] References Cited

U.S. PATENT DOCUMENTS

| | | | |
|---|---|---|---|
| 4,081,754 | 3/1978 | Jackson | 325/396 |
| 4,228,543 | 10/1980 | Jackson | 455/181 |
| 4,287,599 | 9/1981 | Goncharoff et al. | 455/77 |
| 4,510,623 | 4/1985 | Bonneau et al. | 455/181 |
| 4,718,107 | 1/1988 | Hayes | 455/4 |
| 4,750,040 | 6/1988 | Hakamada | 358/188 |
| 4,930,160 | 5/1990 | Vogel | 380/23 |
| 5,033,085 | 7/1991 | Rew | 380/20 |
| 5,168,372 | 12/1992 | Sweetser | 358/349 |
| 5,382,983 | 1/1995 | Kwoh et al. | 348/716 |
| 5,465,113 | 11/1995 | Gilboy | 348/5.5 |
| 5,548,345 | 8/1996 | Brian et al. | 348/734 |
| 5,583,576 | 12/1996 | Perlman et al. | 348/5.5 |
| 5,719,618 | 2/1998 | Park | 348/5.5 |
| 5,751,335 | 5/1998 | Shintani | 348/5.5 |

OTHER PUBLICATIONS

Stephen A. Booth, "The V chip: new circuitry blocks the bad stuff from your kids TV. ", Popular Mechanics, Jun. 1996, v 173, n 6, P 50 (2).

*Primary Examiner*—Nathan Flynn
*Assistant Examiner*—Kieu-Oanh Bui

[57] ABSTRACT

A receiver which is tunable to any of a plurality of modulated carrier signals, said receiver comprising a tuner local oscillator the frequency of which is determined by a control circuit responsive to a user input indicating the selection of a modulated carrier signal to which the receiver should tune, and a non-volatile memory connected to said control circuit for storing information, and a real time clock connected to said control circuit for providing current time, said control circuit being responsive to a user entered channel viewing matrix which is stored in said non-volatile memory and is compared to information provided by said real time clock, said user entered channel viewing matrix defining times of certain channels of which said control circuit will be prohibited from allowing said receiver to tune, said control circuit comprising a control means for automatically changing channels to the next valid channel if the current channel is or becomes invalid, and a data entry means for entering information into said user entered channel viewing matrix, whereby said receiver will only allow viewing of television programs as defined in said user entered channel viewing matrix.

14 Claims, 20 Drawing Sheets

| MAIN MENU |
|---|
| EXIT |
| DISABLE ALL CHANNELS: ☐ YES, ☑ NO |
| EDIT/ VIEW WEEKLY PROGRAM SCHEDULE |
| WEEKLY SCHEDULE STATUS: ☑ ENABLED, ☐ DISABLED |
| EDIT / VIEW DISCRETE PROGRAM SCHEDULE |
| DISCRETE SCHEDULE STATUS: ☑ ENABLED, ☐ DISABLED |
| HELP |
| SET CLOCK & CALENDAR |
| ↑,↓ TO SELECT, THEN "ENTER" |

Fig. 2A

| DISABLE ALL CHANNELS ||
|---|---|
| YES<br>ALL CHANNELS WILL BE UNCONDITIONALLY DISABLED REGARDLESS OF WEEKLY & DISCRETE SCHEDULE STATUS. | NO<br>ALL CHANNELS WILL BE UNCONDITIONALLY ENABLED REGARDLESS OF WEEKLY & DISCRETE SCHEDULE STATUS. |
| ←,→ TO SELECT, THEN "ENTER" ||

Fig. 2B

| WEEKLY PROGRAM CALENDAR ||||||||
|---|---|---|---|---|---|---|---|
| E<br>X<br>I<br>T | SUNDAY | MONDAY | TUESDAY | WEDNESDAY | THURSDAY | FRIDAY | SATURDAY |
| | | ● | | ● | | ● | ● |
| ←, → TO SELECT, THEN "ENTER" ||||| " ● " INDICATES DAYS THAT HAVE EXISTING WEEKLY PROGRAMMING |||

Fig. 2C

| WEEKLY PROGRAM STARTING<br>CONDITIONS FOR "SELECTED DAY" ||||
|---|---|---|---|
| E<br>X<br>I<br>T | EDIT / VIEW<br>EXISTING<br>SCHEDULE | BEGIN / RESET<br>WITH ALL<br>CHANNELS<br>ENABLED | BEGIN / RESET<br>WITH ALL<br>CHANNELS<br>DISABLED |
| ←, → TO SELECT, THEN "ENTER" ||||

Fig. 2D

| WEEKLY PROGRAM STARTING<br>CONDITIONS FOR "SELECTED DAY" |||
|---|---|---|
| E<br>X<br>I<br>T | BEGIN / RESET WITH<br>ALL CHANNELS<br>ENABLED | BEGIN / RESET WITH<br>ALL CHANNELS<br>DISABLED |
| ←, → TO SELECT, THEN "ENTER" |||

Fig. 2E

| WEEKLY PROGRAMMING FOR "SELECTED DAY" | | | | |
|---|---|---|---|---|
| E X I T | CHANNEL # | ACTION | STARTING TIME | ENDING TIME |
| | | | | |
| | | | | |
| | | | | |
| | | | | |
| | | | | |
| | | | | |
| ←,→,↑,↓,+,-, TO SELECT, THEN "ENTER" OR "DELETE" | | | | |

ALL CHANNELS ARE "ENABLED / DISABLED" EXCEPT AS DEFINED BELOW

Fig. 2F

| SAVE AND / OR EXIT | |
|---|---|
| SAVE CHANGES ON EXIT | EXIT WITHOUT SAVING CHANGES |
| ←,→  TO SELECT, THEN "ENTER" | |

Fig. 2G

| WEEKLY SCHEDULE STATUS ||
|---|---|
| ENABLE | DISABLE |
| THIS SELECTION WILL ENABLE THE WEEKLY SCHEDULE. NOTE, WHEN THE WEEKLY AND DISCRETE SCHEDULES ARE BOTH ENABLED THE DISCRETE SCHEDULE WILL ALWAYS TAKE PRECEDENCE DURING TIMES OF CONTRADICTION. | THIS SELECTION WILL DISABLE THE WEEKLY SCHEDULE. NOTE, WHEN THE WEEKLY AND DISCRETE SCHEDULES ARE BOTH ENABLED THE DISCRETE SCHEDULE WILL ALWAYS TAKE PRECEDENCE DURING TIMES OF CONTRADICTION. |
| ←,→ TO SELECT, THEN "ENTER" ||

Fig. 2H

| DISCRETE PROGRAM CALENDAR "SELECTED MONTH, YEAR" |||||||||
|---|---|---|---|---|---|---|---|---|
| | | SUNDAY | MONDAY | TUESDAY | WEDNESDAY | THURSDAY | FRIDAY | SATURDAY |
| E | | 1 • | 2 | 3 | 4 | 5 | 6 | 7 |
| X | | 8 | 9 | 10 • | 11 | 12 | 13 | 14 |
| I | | 15 | 16 | 17 | 18 | 19 | 20 • | 21 |
| | | 22 | 23 • | 24 | 25 | 26 | 27 | 28 |
| T | | 29 | 30 | 31 | | | | |
| ↑,↓,←,→, TO SELECT, THEN "ENTER" | | | | | | "•" INDICATES DAYS THAT HAVE DISCRETE PROGRAMMING |||

Fig. 2I

| DELETE OR PROGRAM | |
|---|---|
| E X I T | EDIT / VIEW EXISTING SCHEDULE | ERASE EXISTING SCHEDULE AND BEGIN PROGRAMMING FROM SCRATCH |
| ←, → TO SELECT, THEN "ENTER" | |

Fig. 2J

| DISCRETE PROGRAMMING FOR "SELECTED DATE" | | | | |
|---|---|---|---|---|
| CHANNELS ARE ENABLED OR DISABLED AS DEFINED BELOW | | | | |
| E X I T | CHANNEL # | ACTION | STARTING TIME | ENDING TIME |
| | | | | |
| | | | | |
| | | | | |
| | | | | |
| | | | | |
| | | | | |
| ←, →, ↑, ↓, +, -, TO SELECT, THEN "ENTER" OR "DELETE" | | | | |

Fig. 2K

| DISCRETE SCHEDULE STATUS | |
|---|---|
| ENABLE | DISABLE |
| THIS SELECTION WILL ENABLE THE DISCRETE SCHEDULE. NOTE, WHEN THE WEEKLY AND DISCRETE SCHEDULES ARE BOTH ENABLED THE DISCRETE SCHEDULE WILL ALWAYS TAKE PRECEDENCE DURING TIMES OF CONTRADICTION. | THIS SELECTION WILL DISABLE THE DISCRETE SCHEDULE. NOTE, WHEN THE WEEKLY AND DISCRETE SCHEDULES ARE BOTH ENABLED THE DISCRETE SCHEDULE WILL ALWAYS TAKE PRECEDENCE DURING TIMES OF CONTRADICTION. |
| ←, → TO SELECT, THEN "ENTER" | |

Fig. 2L

GENERAL HELP

THIS SCREEN ONLY GIVES A GENERAL OVERVIEW OF THE CHANNEL CONTROL SYSTEM. PLEASE REFER TO THE OWNER'S MANUAL FOR A MORE DETAILED DESCRIPTION AND OPERATION.

THIS IS THE MAIN MENU OF THE CHANNEL CONTROL SYSTEM. THE CHANNEL CONTROL SYSTEM IS DESIGNED TO ENABLE OR DISABLE A SPECIFIC CHANNEL(S) WITH RESPECT TO THE TIME OF DAY, DAY OF WEEK, AND MONTH. IN THIS MANNER THE VIDEO SUPERVISOR CAN TARGET SPECIFIC PROGRAMS BY SIMPLY KNOWING THE TIME, DAY AND CHANNEL THAT A PROGRAM IS AIRED.

THE CHANNEL CONTROL SYSTEM ALLOWS THE VIDEO SUPERVISOR TO MANAGE VIEWING IN THREE DIFFERENT WAYS:

1) FIRST, A WEEKLY SCHEDULE CAN BE PROGRAMMED TO ENABLE / DISABLE CHANNELS ON A REPETITIVE "WEEK" BASIS. IN THIS MANNER, SHOWS THAT REPEAT EVERY WEEK ONLY NEED TO BE ENTERED ONCE.
2) SECOND, A DISCRETE SCHEDULE ALLOWS NON-REPETITIVE EVENTS TO BE ENABLED / DISABLED. WHEN THE DISCRETE SCHEDULE IS ENABLED IT WILL OVER-RIDE THE WEEKLY SCHEDULE IN TIMES OF CONTRADICTION. IN THIS MANNER, SINGLE EVENTS CAN BE TARGETED WITHOUT NEEDING TO REPROGRAM THE WEEKLY SCHEDULE. ONCE THE NON-REPETITIVE EVENT HAS PASSED, THE CONTROL SYSTEM WILL AUTOMATICALLY ERASE THE RELATED PROGRAM INFORMATION.
3) THIRD, ALL CHANNELS CAN BE DISABLED. THIS SELECTION WILL DISABLE ALL CHANNELS UNTIL IT IS DE-SELECTED. THE WEEKLY AND DISCRETE SCHEDULES ARE AUTOMATICALLY DISABLED WHEN THIS SELECTION IS CHOSEN.

WHEN THE "DISABLE ALL CHANNELS" SELECTION IS CHOSEN, THE WEEKLY AND DISCRETE SCHEDULES ARE AUTOMATICALLY DISABLED. HOWEVER, THE WEEKLY AND DISCRETE SCHEDULES CAN BE USED INDEPENDENTLY OR IN CONCERT WHEN ENABLED. WHEN BOTH THE WEEKLY AND DISCRETE SCHEDULES ARE ENABLED THE DISCRETE SCHEDULE WILL OVER-RIDE THE WEEKLY SCHEDULE DURING TIMES OF CONTRADICTION.

THE WEEKLY AND DISCRETE SCHEDULES CAN BE PROGRAMMED BY BEGINNING WITH THE EXISTING SCHEDULE FOR THAT DAY / DATE (IF ONE EXISTS). A WEEKLY SCHEDULE CAN ALSO BE PROGRAMMED BY BEGINNING WITH ALL CHANNELS ENABLED OR DISABLED FOR THAT DAY. WHEN WEEKLY PROGRAMMING IS BEGUN WITH ALL CHANNELS ENABLED / DISABLED, THE TARGETED PROGRAMS (CHANNELS AND TIMES) ARE CONVERSELY DISABLED / ENABLED. FURTHER, A PRECISE SEQUENCE OF TELEVISION SHOWS CAN BE VIEWED BY ONLY ENABLING THEIR ASSOCIATED CHANNELS AND TIMES. IN THIS MANNER ONLY ONE CHANNEL IS VALID AT A TIME AND THE CONTROL SYSTEM WILL AUTOMATICALLY SWITCH TO THE NEXT (ONLY) AVAILABLE CHANNEL.

NOTE: THE CLOCK AND CALENDAR MUST BE RESET DURING "DAYLIGHT SAVINGS" TIME CHANGES AND "LEAP" YEARS.

PRESS "ENTER" TO EXIT

Fig. 2M

| CLOCK & CALENDAR |
|---|
| CURRENT DATE & TIME: 12/29/96, SUNDAY, 09:05 pm |
| RESET DATE & TIME TO : MM/DD/YY, "DAY OF WEEK", HH:MM am/pm |
| SAVE CHANGES AND EXIT |
| ↑,↓,+,-, TO SELECT, THEN "ENTER" |

Fig. 2N

CHANNEL DISABLED

CHANNEL: "##", MM/DD/YY, "DAY OF WEEK", HH:MM am/pm

THIS CHANNEL IS ENABLED OR DISABLED AS DEFINED BELOW

| | CHANNEL # | ACTION | STARTING TIME | ENDING TIME |
|---|---|---|---|---|
| E X I T | | | | |
| | | | | |
| | | | | |
| | | | | |
| | | | | |
| | | | | |

↑,↓, TO VIEW, THEN "EXIT"

Fig. 2P

PROGRAMMABLE VIDEO CHANNEL CONTROLLER

BACKGROUND

1. Field of Invention

This invention relates to electronically tuned receivers and, more particularly, to a parental control system for video receivers.

2. Description of Prior Art

It is widely acknowledged that the sexual content and violence of most television programs are inappropriate for young viewers. Furthermore, it is also widely accepted that children who spend excessive time viewing television suffer from lower scholastic achievement and social development. Such viewing includes not only broadcast television but video games and video cassettes. Compounding the problem is the fact that children often watch television without parental supervision. While a number of patented devices attempt to address the above problems, they suffer from several drawbacks. The objective of this invention is to solve these problems by providing a viewing control device that is cost-effective, easy to manufacture and simple to operate.

The prior art includes several devices which control television viewing in some manner. For example, U.S. Pat. No. 4,718,107 (Hayes) describes a cable television (CATV) converter which utilizes an access code to select channels for continuous blocking. However, this unit cannot block individual channels with respect to the time of day and therefore is unable to target specific programs. Also, the unit becomes completely disabled and looses its memory after extended power loss and can only be enabled from a centrally located computer within the cable network. Therefore this invention has the additional disadvantage of requiring an external support structure to enable the unit.

U.S. Pat. No. 5,382,983 (Kwoh) utilizes compressed code in order to select programs for viewing. The compressed code is downloaded into the device and defines television program names, channels and times for viewing. In this manner the unit can target individual programs. However, the compressed code requires additional decoding circuitry and an external support structure to make, publish, and distribute the code. A final downfall of this device is the inability to control video games and video cassette viewing.

Another device recently receiving media attention is the "V-Chip". (Popular Mechanics, June 1996 v173 n6 p50) Utilizing a rating system similar to that used in movie theaters, this unit allows the parent to program their television with respect to a given rating(s). In this manner the television will only permit those programs within the allowed rating classification(s) to be viewed. However, this device requires an external support structure of immense proportions to not only rate every single program that is aired but also to broadcast this rating with each program. Furthermore, both desirable and undesirable programs may fall within a given rating. Therefore, if a parent denies a specific rating because of the objectionable programs, then the desirable programs will be denied as well. In this light the device suffers from the inability to target specific programs. Additionally the device cannot be programmed to display a precise sequence of television shows and therefore cannot precisely control a child's viewing. A final downfall of this device is the inability to control video games and video cassette viewing.

U.S. Pat. No. 5,548,345 (Brian) is a device that provides selective television viewing by serving as an interface between various components of video equipment. However, the extensive circuitry needed to accomplish the various embodiments is expensive. Furthermore, the device has the following shortcomings:

a) The device will not automatically clear the memory locations of non-repetitive programming that has transpired, and therefore requires a large amount of memory.

b) The device fails to have separate programming screens for repetitive and non-repetitive schedules. Instead, all of the programming is co-mingled on one menu screen which may contain years of information. This pitfall allows the user to edit and store repetitive programming information at any point in time along with the non-repetitive programming. Therefore as time passes, the user programming is literally stored over years of information. When the user decides to change any programming, the user must review and edit ALL of this historical program information. This is not only very cumbersome and confusing to the user, but requires a very large amount of memory as well. This problem is compounded by the fact that the device fails to clear the memory locations of non-repetitive programming that has transpired. Therefore the programming screen not only contains the co-mingling of repetitive and non-repetitive programming data, but the menu screen also contains obsolete and distracting programming that has expired.

c) The device can only be programmed in "cell" intervals which is inappropriate for the odd showings of many cable and satellite programs.

d) The device does not simplify programming by having the option to begin programming with all channels disabled, or enabled.

e) The device does not have a simplifying top-level viewing of existing user programming.

f) The device does not anticipate a programming contradiction between repetitive, and non-repetitive program schedules.

g) The device does not have the ability to automatically change from an invalid channel to a valid channel.

h) When the device is programmed for "show", it will power on the television even if there is no one there to watch it, and even if the persons in the room don't want to watch it.

i) The device does not have a simplified and user friendly menu system.

U.S. Pat. No. 5,583,576 (Perlman), and U.S. Pat. No. 5,751,335 (Shintani), are both devices that control television viewing based on a rating criteria that is broadcast with the television program. Likewise, these inventions suffer from the same drawbacks as the "V-Chip" as discussed above.

U.S. Pat. No. 5,465,113 (Gilboy) is a device that is focused on the cable television industry. Here the user can program the cable TV box for total viewing time allotments for specified channels. The device can also be programmed for user viewing preferences. However, the device is unable to target specific television/cable programs.

U.S. Pat. No. 5,719,618 (Park) is a device that is focused on supervising the use of video cassette recorders which contain on screen display (OSD) programming. Here the user can disable the video cassette recorder by entering a secrete code. However, the device is unable to inhibit specific television programs, or channels.

U.S. Pat. No. 4,510,623 (Bonneau) Is a novel invention utilizing a microprocessor as an integral part of the tuner's local oscillator. The microprocessor of which can be programmed to inhibit viewing of selected channels until a fixed timer expires. However, this device suffers from the inability to selectively block a channel with respect to the time of day, week, month or year. Furthermore, this device fails to have a repetitive schedule in which regularly aired programs can be inhibited without reentry of the program information.

U.S. Pat. No. 4,081,754 (Jackson) Utilizes a seven day clock and a memory storage device to control television viewing. However, this invention can only control viewing on a weekly basis and therefore cannot be programmed for single events that are more than a week away. Furthermore, the unit can only be programmed in ½ hour intervals. This ½ hour limitation is incompatible with the odd times that many cable and satellite programs are aired. Further, the device neglects to include a battery backup for the clock and hence subjects the unit to easily being defeated by simply interrupting external power. Lastly, the unit fails to utilize a microprocessor which would allow on screen programming and the ability to easily use the same circuitry to enable or disable channels.

U.S. Pat. No. 5,168,372 (Sweetser) Is a device that monitors and controls the viewing time of a plurality of viewers. Each viewer is assigned a password and each password is defined to have a maximum total viewing time per week. Also, each password can be programmed to have "blocked" times throughout the day in which viewing is prohibited. However, unsupervised children can still watch television when another's password has been entered into the device, and the device fails to block specific channels with respect to the time of day. Therefore, the device cannot target individual programs.

OBJECTS AND ADVANTAGES

Accordingly, several objects and advantages of my programmable video channel controller are:

b) To provide a programmable video channel controller which can target specific individual television programs either for viewing or for blocking.

c) To provide a programmable video channel controller which can be programmed to display a specific sequence of television shows and therefore precisely select a child's television viewing.

d) To provide a programmable video channel controller which contains a repetitive weekly schedule for enabling and/or blocking repetitive television shows and therefore eliminating the need for repeated programming.

e) To provide a programmable video channel controller which contains a non-repetitive schedule for enabling or blocking unique events.

f) To provide a programmable video channel controller which can accommodate the odd times in which cable and satellite television programs are aired.

g) To provide a programmable video channel controller which is easy to use and leads the user through the programming steps in a logical manner.

h) To provide a programmable video channel controller which can block and or limit the use of video games and video cassette players.

i) To provide a programmable video channel controller which appeals to both parents and any other persons who are responsible for television viewing. Such as teachers, employers, night club managers, electronic retail store supervisors, etc.

j) To provide a programmable video channel controller which cannot be defeated if external power is interrupted.

k) To provide a programmable video channel controller which has a method for security access.

l) To provide a programmable video channel controller which can be embodied in a television set, cable television (CATV) receiver, Video Cassette Recorder (VCR), satellite television receiver, or as a stand alone unit.

m) To provide a programmable video channel controller which does not require an external support group or system.

n) To provide a programmable video channel controller which is simple and inexpensive to manufacture by utilizing existing technologies, by modifying contemporary video receiver designs as little as possible, and by introducing the fewest number of additional circuit components.

o) To provide a programmable video channel controller that minimizes memory requirements by automatically clearing the memory locations of non-repetitive programming that has become obsolete.

p) To provide a programmable video channel controller which anticipates a programming contradiction between repetitive, and non-repetitive schedules.

q) To provide a programmable video channel controller which simplifies user programming by allowing the user to begin programming with all channels either disabled, or enabled.

r) To provide a programmable video channel controller which simplifies user programming by containing repetitive and non-repetitive program schedules that are edited separately from each other.

s) To provide a programmable video channel controller which has the ability to automatically change from an invalid channel to a valid channel.

Further objects and advantages will become apparent from a consideration of the drawings and ensuing description.

SUMMARY

The foregoing and other objects of the invention are attained in the hardware and software combination of an electronically tuned video receiver. Such a receiver having a tuner local oscillator (frequency synthesizer), the frequency of which is controlled by a phase lock loop having a programmable frequency divider. A microprocessor receives a user input from a keyboard or remote transmitter indicating a desired channel. In response to this input, the microprocessor normally loads a programmable constant in the programmable frequency divider to cause the tuner to be tuned to the desired channel. However, the microprocessor is programmed to respond to a user defined channel viewing matrix which limits channel viewing with respect to the channel, time of day and the day of week, or date. Should the user input indicate an invalid channel for the current time, day or date, the microprocessor will not load the corresponding programmable constant in the programmable frequency divider. Instead, the microprocessor will momentarily display the days channel viewing matrix for the invalid channel and will then revert back to the original valid channel. Additionally, the microprocessor continuously monitors the currently selected channel. Should the currently selected channel become invalid, the microprocessor will automatically change channels to one of the remaining valid channels (if any). If no valid channels exist, the microprocessor will display the days programming for the currently selected channel.

Key to the success of the present invention is the user defined channel viewing matrix. This matrix is stored in non-volatile memory and is user programmed by an on-screen programming means. The on-screen programming means consists of a menu system that navigates the user through the programming steps in a logical manner. This enables the user to program the channel viewing matrix in three different ways. First, all channels can be enabled or disabled for an indeterminate period of time. Second, a weekly program schedule can be programmed to enable or disable a given channel(s) with respect to the time of day and the day of week. In this manner the user only needs to enter the weekly repetitive events a single time. Third, a discrete non-repetitive program schedule can be programmed to enable or disable a given channel(s) with respect to the time of day and the date. Further, if the discrete program schedule and the weekly schedule are both simultaneously enabled, the discrete program schedule will take precedence during times of contradiction. In this manner the user can program the discrete schedule for unique (non-repetitive) events without having to modify the weekly program schedule.

When the above electronic receiver and channel viewing matrix are used in concert, important results are obtained. First, individual television programs can be targeted for viewing or for blocking by simply entering the channel(s) and times that the program is aired. If the television program repeats every week then the applicable channel(s), times and day(s) of the week are entered into the weekly program schedule. If the television program is a unique or non-repetitive event, then the corresponding channel(s), times, and date are entered into the discrete program schedule. Secondly, since video games, video cassette recorders (VCR), cable television (CATV) receivers and satellite receivers are commonly viewed through channels three or four, the use of these devices can be limited by correspondingly limiting the viewing time(s) of channels three and four. Lastly, the present invention can be programmed to display a precise sequence of television shows. This is achieved by programming the channel viewing matrix to have only one valid channel at any given time. When the currently selected channel becomes invalid, the microprocessor will automatically change channels to the only remaining valid channel. In this manner, a child's television viewing can be precisely controlled.

Access to the on-screen programming menus is limited to persons containing the security password. Once the security password is entered, the user can disable or enable all channels, enable or disable the weekly and discrete program schedules, and the user can edit and or view the weekly and discrete program schedules. As an added security measure, all user programming is saved in non-volatile memory, and the real time clock has a power backup. This will prevent the system from being foiled when external power is interrupted.

Finally, the low cost and ease of manufacture of the present invention is obtained by utilizing existing technologies, by modifying contemporary receiver design as little as possible and by introducing the fewest number of additional circuit components. Further objects and advantages will become apparent from a consideration of the ensuing description and drawings.

DRAWING FIGURES

In the drawings, closely related figures have the same number but different alphabetic suffixes.

FIGS. 2A–2N and FIGS. 2P–2Q are illustrations depicting the on-screen programming screens.

DESCRIPTION—FIGS. 1A–1B, 2A–2N, 2P–2Q, 3A–3J

Figure 1A:
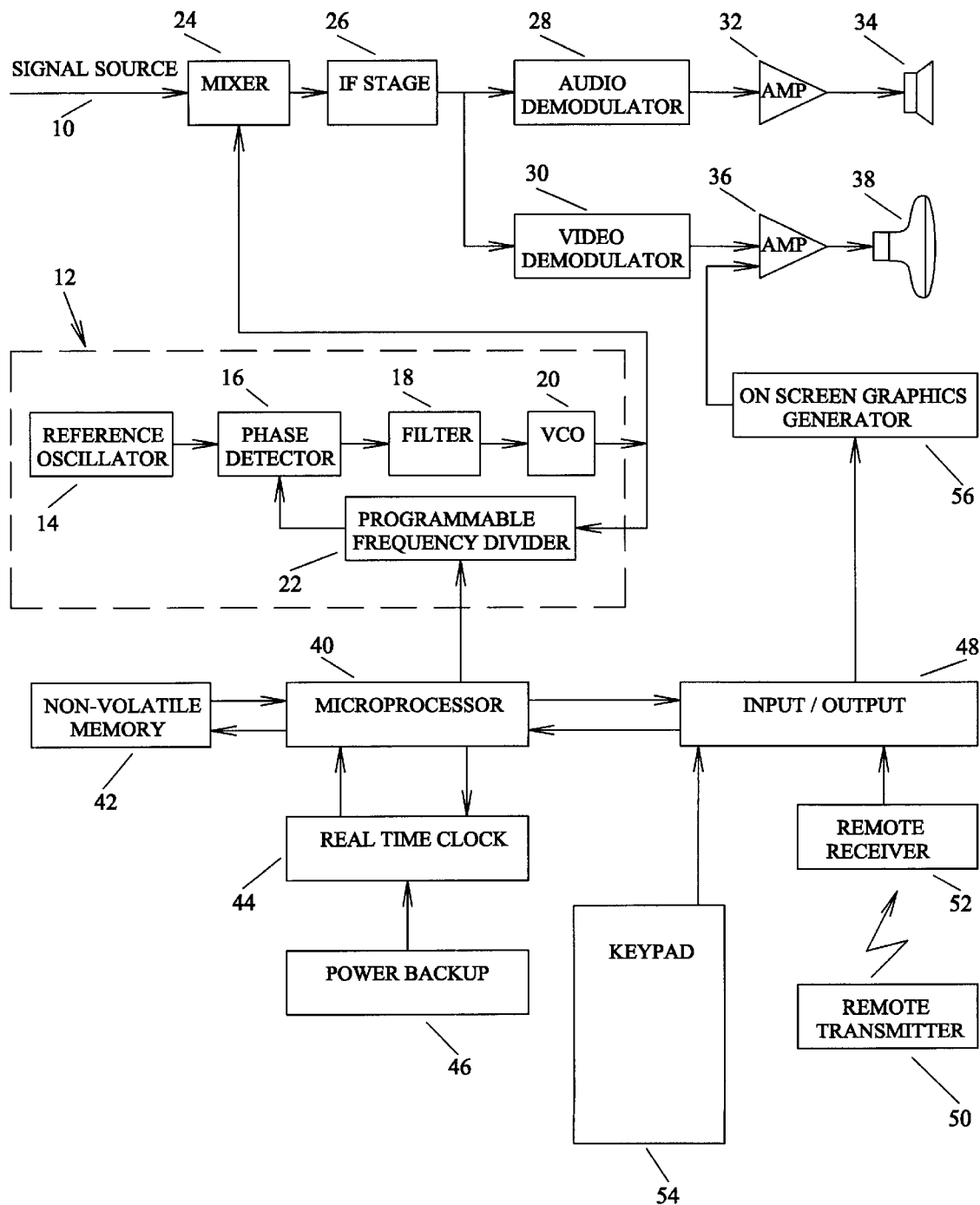
FIG. 1A is a block diagram of the programmable video channel controller circuitry when embodied in a television set.

A typical embodiment of the present invention is shown in FIG. 1A. Here, the programmable video channel controller is embedded in a modern television receiver. A signal source 10 may be derived from an antenna but could also be obtained from a video cassette recorder (VCR), satellite receiver, cable television (CATV) network, video games, etc. . . . A tuner local oscillator 12 is organized in a phase lock loop (frequency synthesizer) configuration and is comprised of a reference oscillator 14, a phase detector 16, a loop filter 18, a voltage controlled oscillator (VCO) 20, and a programmable frequency divider 22. Output from a mixer 24 is fed into a intermediate frequency (IF) stage 26 and is then further refined at a audio demodulator 28 and a video demodulator 30. A audio amplifier 32 magnifies the audio demodulator output and then passes it on to a speaker 34. Likewise a video amplifier 36 magnifies the video signal and then displays it on a television screen 38. A microprocessor 40 is the heart of a modern television receiver. Although microprocessor 40 controls various functions of the television, only the detail necessary to understand the present invention is given so as not to detract from understanding the present invention. Microprocessor 40 utilizes a non-volatile memory 42 for operating code, and storage and retrieval of data. Such data includes the user defined channel viewing matrix of the present invention (mentioned above). A real time clock 44 provides the time of day, day of week, and date (calendar) information to microprocessor 40. Real time clock 44 is not to be confused with the standard microprocessor timing clock (not shown). A power backup 46 provides auxiliary power to real time clock 44 during times of power interruption and thus prevents real time clock 44 from loosing time. Microprocessor 40 is interfaced with a on-screen graphics generator 56 and television screen 38 by way of a input output circuit (I/O) 48. Graphics generator 56 is used to generate on-screen programming screens which allow visual feedback to the user. On-screen programming is not new to the art and is commonly utilized in VCR design. User commands are communicated to microprocessor 40 either by a control panel keyboard 54 or a remote transmitter 50 and a remote receiver 52. Although specific designs will differ, most of the hardware mentioned thus far is conventional to modern television receivers.

Figure 1B:
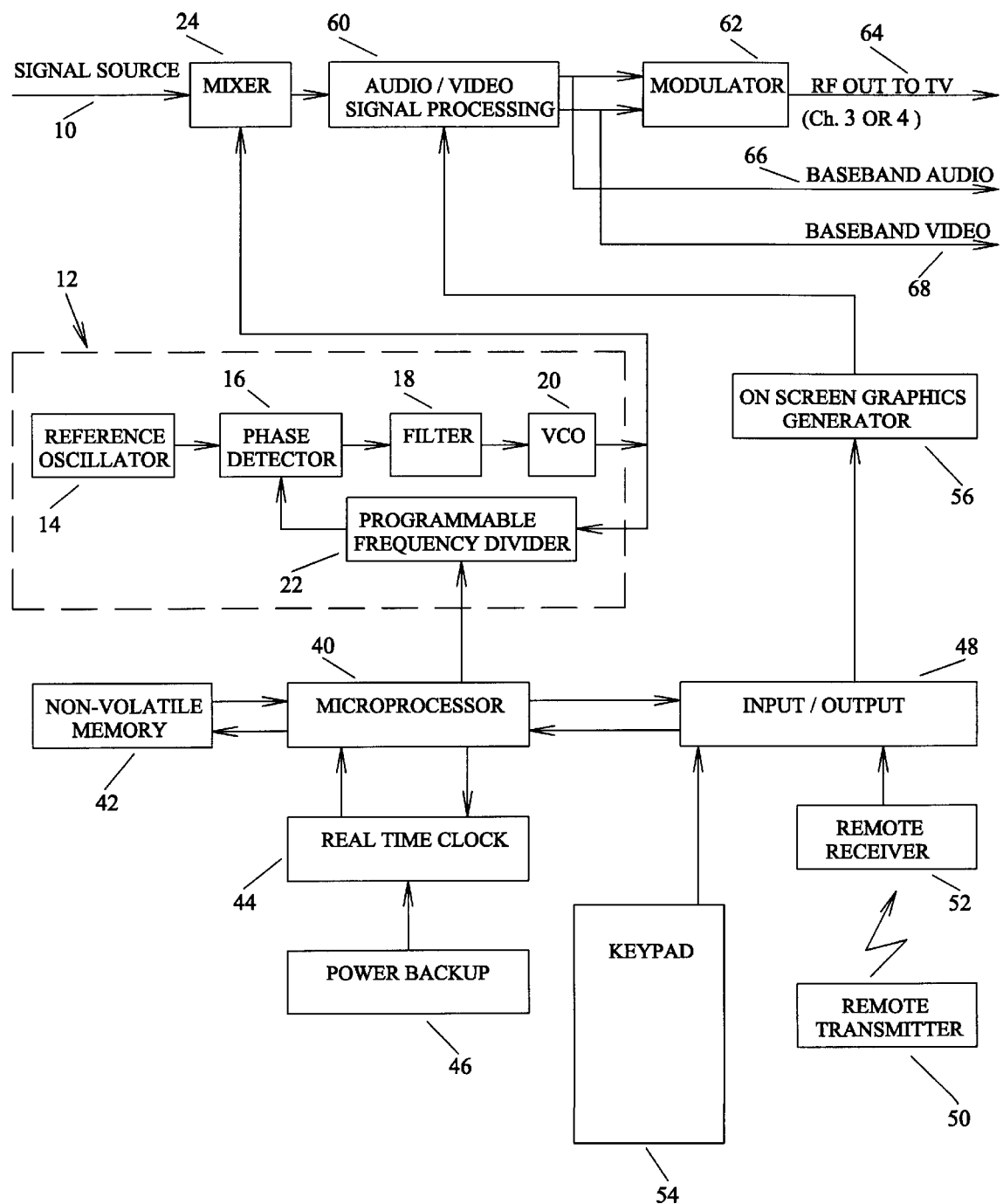
FIG. 1B is a generic block diagram of the programmable video channel controller circuitry when embodied in a Video Cassette Recorder (VCR), Cable Television (CATV) box, Satellite Receiver, or as a stand alone unit.

FIG. 1B generically details the present invention as embodied in a Video Cassette Recorder (VCR), Cable Television (CATV) box, Satellite Receiver, or as a stand alone unit. The circuitry is essentially the same as in FIG. 1A except that the mixer output is now forwarded to a audio/video signal processing circuit 60. This circuitry may include a descrambling capability. A baseband audio output 66 and a baseband video output 68 from processing circuit 60 are supplied to a RF modulator 62 which provides at its output a standard television signal 64. Signal 64 usually corresponds to channel three or four, for connection to a television's RF input (e.g. antenna terminals). Alternatively, baseband outputs 66 and 68 may be connected directly to a television's baseband input terminals.

Figure 2Q:
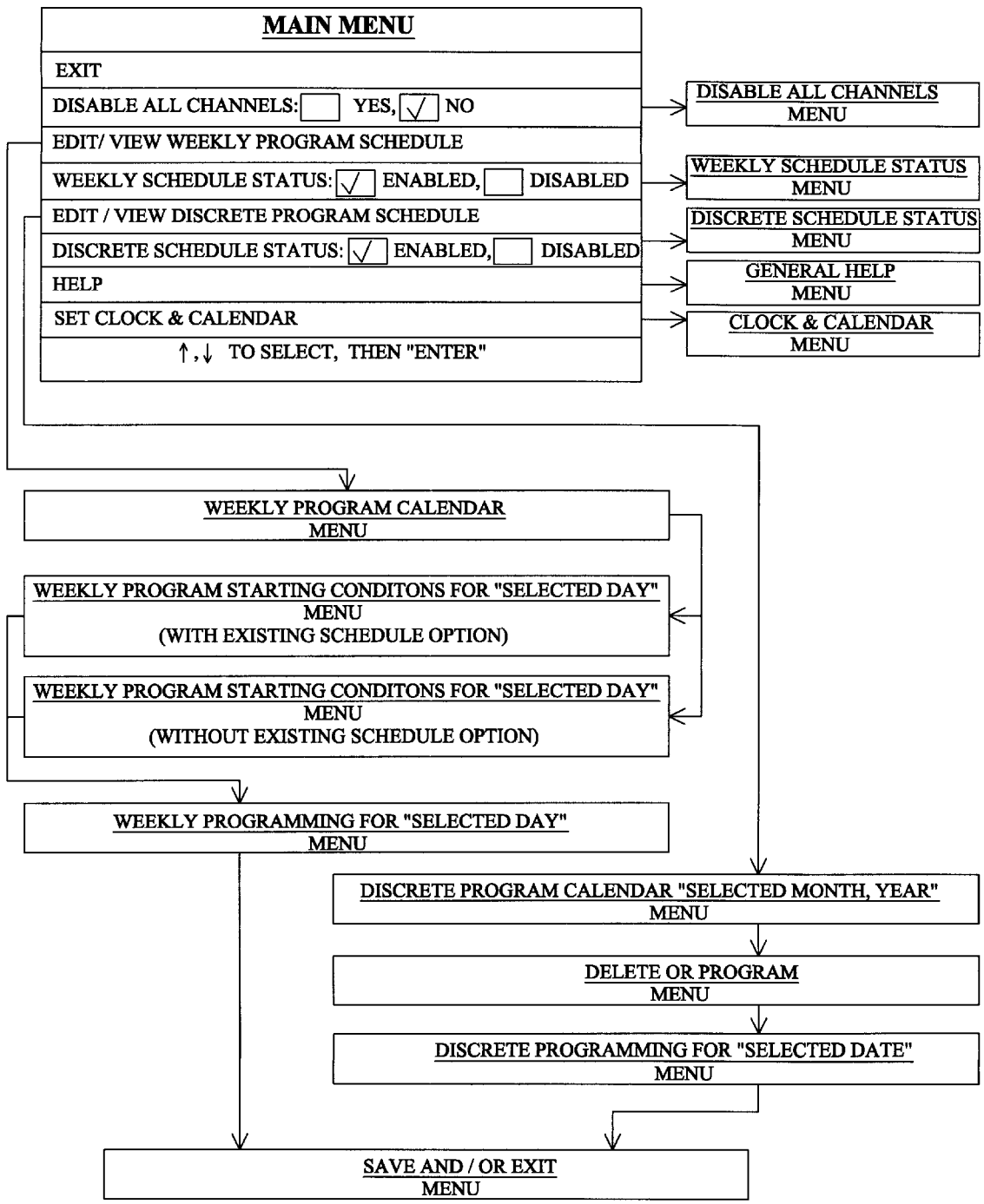

FIGS. 2A–2N are illustrations depicting the on-screen programming screens. These screens are produced by graphics generator 56 and are displayed on the television screen as a visual interface between the present invention and the user. Additionally, the screens are organized in an intuitive manner that will logically navigate the user through the programming steps. The main menu screen is depicted in FIG. 2A and serves as the "top" of the menu tree. User selections can be made from the main menu to: exit the main menu and return to television viewing, disable all channels, edit and or view the weekly program schedule, enable or disable the weekly schedule, edit and or view the discrete program schedule, enable or disable the discrete schedule, view the help screen, and lastly, to reset the clock and calendar. A complete menu tree of the various on-screen programming screens is depicted in FIG. 2Q. Careful study of FIG. 2Q will reveal the relationships between the various screens and will help facilitate an understanding of the present invention. Note that the title of each screen is underlined and is positioned at the top of the screen.

FIG. 2P depicts the channel disabled screen. This screen is displayed when an invalid channel selection has been made and contains the days channel viewing matrix for this channel. Also contained in the title bar of the channel disabled screen is the current channel number, the current date, the current day of the week, and the current time. In this manner one can view the channel disabled screen in order to determine when the channel can be viewed.

Figure 3A:
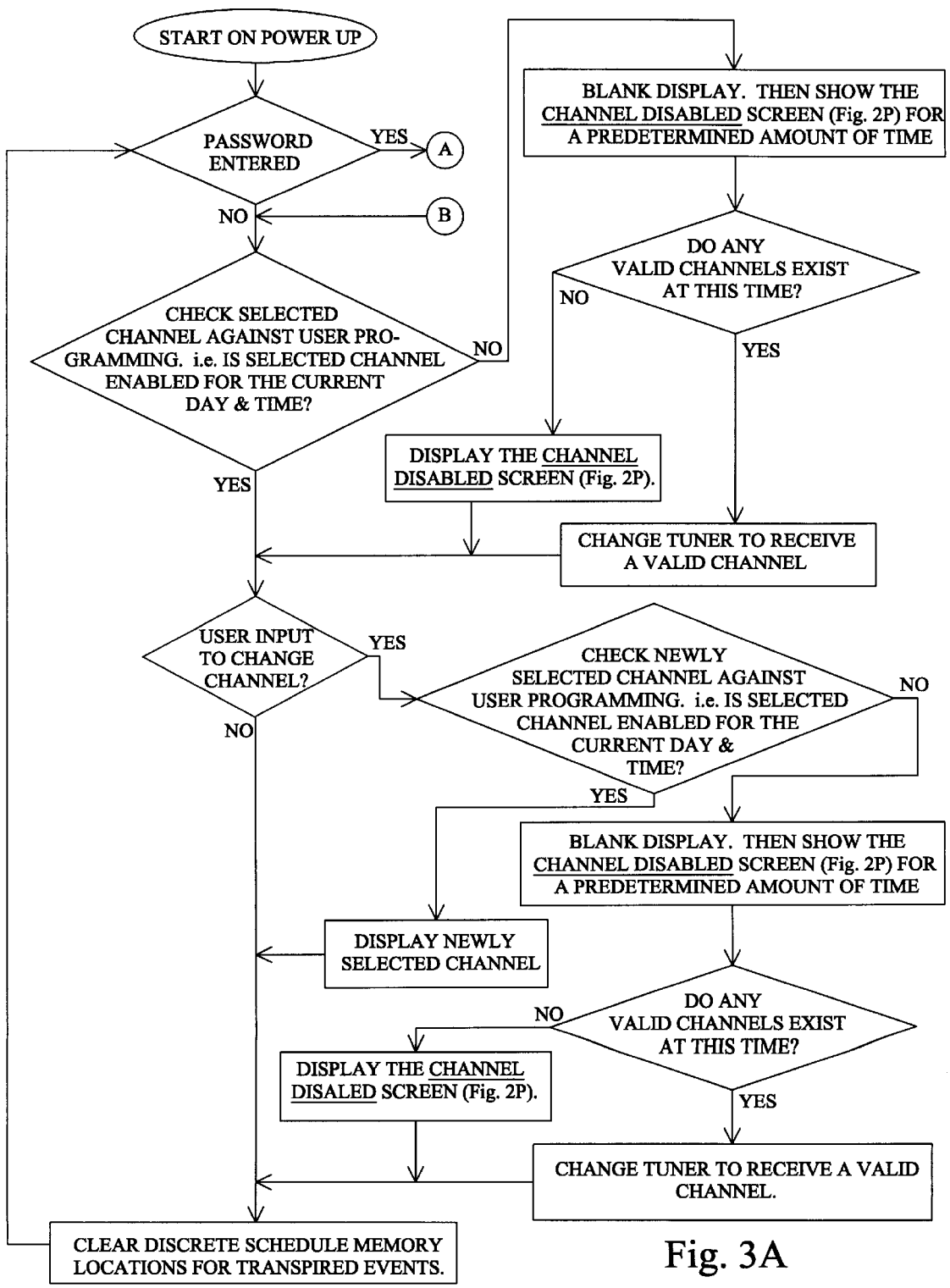
FIGS. 3A–3J are flow charts depicting microprocessor programming and how it relates to the on-screen programming screens and user data entry.
Figure 3B:
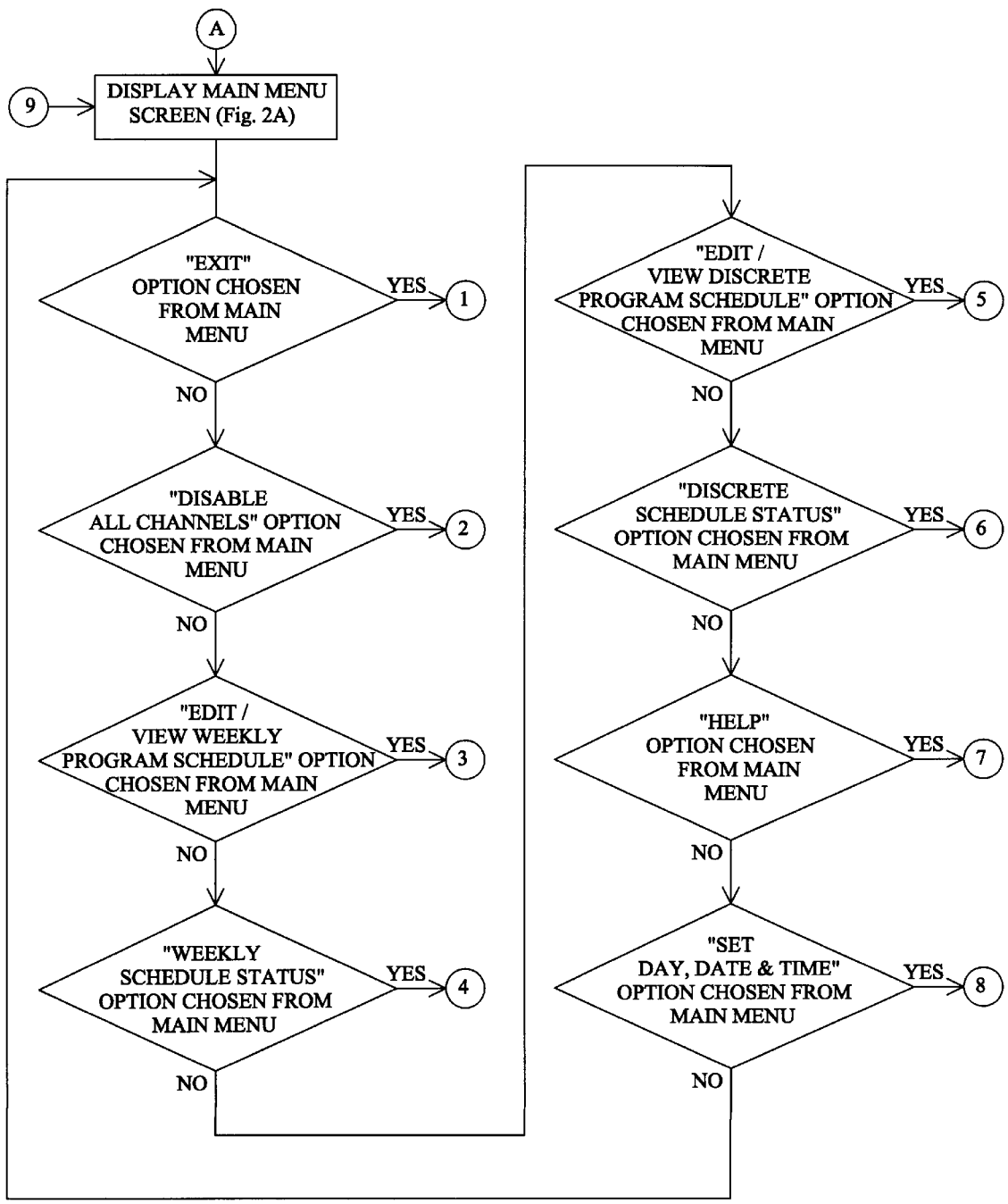

FIGS. 3A–3J are flow charts depicting microprocessor programming (operating code) and how it relates to the on-screen programming screens, and user inputs. Additionally, FIGS. 3A–3J are all interconnected by the circled letters and numbers and collectively represent one flow chart. Although the microprocessor may perform other duties such as volume control etc., these functions are not detailed in the flow charts as they would detract from understanding the present invention. FIG. 3A depicts the main loop of the microprocessor and is initiated upon the unit being turned on. Here the microprocessor monitors the user inputs for password entry and channel selection. Additionally, channel validity is monitored and memory locations are cleared for transpired events which have been programmed into the discrete program schedule. Should the user input a valid password, the microprocessor will revert to the main loop of the on-screen programming algorithm. The main loop of the on-screen programming algorithm is detailed in FIG. 3B. Here the user can make main menu selections as detailed in the discussion of FIG. 2A above. These selections are executed by utilizing the flow charts depicted in FIGS. 3C–3J. Careful study of FIGS. 3A–3J and their associated relationship with FIGS. 2A–2N and 2P–2Q will provide insight and understanding to the present invention. Note that flow chart references to the various menu screens are indicated by the underlined title of the applicable menu screen(s) and by their figure number.

OPERATION—FIGS. 1A–1B, 2A–2N, 2P–2Q, 3A–3J

The channel control feature of the present invention described below is a software and hardware combination of the microprocessor, non-volatile memory, on-screen graphics generator, real time clock, and the tuner local oscillator of a television receiver. In the embodiment to be described in FIG. 1A, the invention is incorporated in a conventional receiver in which the display device, e.g., a TV tube, speakers, and signal processing circuits are located within a single cabinet. However, it should be borne in mind that television receivers of the future may be made up of separately sold components and the invention herein may be incorporated in the tuning subcomponents of the system or in another component for interaction therewith. Additionally, modern television receiver design and operation is widely understood and therefore will not be described in detail. However, understanding the role of the microprocessor in a modern television receiver will be discussed in order to fully understand the present invention.

A typical embodiment of the present invention is shown in FIG. 1A. Here, the programmable video channel controller is embedded in a modern television receiver. The heart of a modern television receiver is the microprocessor 40 which controls all the functions of the tuning system. Microprocessor 40 controls which channel is tuned by sending a programmable constant to tuner local oscillator 12. The resulting signal produced by oscillator 12 is then combined with signal source 10 by way of mixer 24. Again, signal source 10 is typically derived from an antenna but could also be obtained from a video cassette recorder (VCR), satellite receiver, cable television (CATV) network, video game, etc. . . . The output of mixer 24 is then processed by intermediate frequency stage 26. The resulting signal is then further refined by audio demodulator 28 and video demodulator 30. The audio signal derived from audio demodulator 28 is then magnified by amplifier 32 and is then fed to speaker 34. The video signal derived from video demodulator 30 is then magnified by amplifier 36 and is then fed to television screen 38. Conversely, if a different programmable constant is not sent to oscillator 12, the channel will not change. Microprocessor 40 receives commands from the user via control panel keyboard 54 or remote control 50. Transmissions from remote control 50 are received by remote receiver 52. The user commands from keyboard 54 or remote transmitter 50 are supplied to microprocessor 40 via input/output (I/O) circuit 48. Microprocessor 40 acts on these commands to produce power control for the receiver, audio control voltages, graphics display for channel identification, band switching, and frequency data for oscillator 12. Graphics display data is supplied by microprocessor 40 to on-screen graphics generator 56 by way of I/O circuit 48. From graphics generator 56 the graphics signal is magnified by amplifier 36 and then displayed on television screen 38. The frequency data for oscillator 12 may be derived in part from non-volatile memory 42. This memory would be used to store, for example, the last channel received prior to power interruption so that, when the power is turned on again, the same channel will be received at that time. Additionally, non-volatile memory 42 is utilized for storing the user defined channel viewing matrix. The channel viewing matrix consists of user defined parameters for enabling or disabling individual channels with respect to the time of day, and the day of week or date. Microprocessor 40 compares the channel viewing matrix in non-volatile memory 42 to real time clock 44. Real time clock 44 maintains the time of day, day of week, and the date. Real time clock 44 is not to be confused with the standard clock used for microprocessor timing (not shown). Further, real time clock 44 is supported by power backup 46. This will prevent the clock from loosing time when external power is interrupted and thus prevent the unit from being foiled. If the current channel is valid, microprocessor 40 will not change the programmable constant in oscillator 12 and thus the existing channel will continue to be displayed. However, if the current channel becomes invalid, microprocessor 40 will load a new programmable constant into oscillator 12 that represents a valid channel. If a valid channel does not exist at the current time, microprocessor 40 will transfer the day's channel viewing matrix information for the selected channel to graphics generator 56 for display on television screen 38. The day's channel viewing matrix information for the selected channel is conveyed by the channel disabled screen FIG. 2P. Likewise, if a user input indicates an invalid channel, microprocessor 40 will transfer the day's channel viewing matrix information for the desired channel to graphics generator 56 for display on television screen 38. After a few moments, or after the user stops actively viewing the channel disabled screen, microprocessor 40 will remove the graphics display and will then revert back to the original valid channel. Again, the channel disabled screen contains the days channel viewing matrix for the selected channel.

FIG. 1B is similar to FIG. 1A and generically details the present invention as embodied in a Video Cassette Recorder (VCR), Cable Television (CATV) box, Satellite Receiver or as a stand alone unit. Likewise the operation is essentially the same as in FIG. 1A except that the mixer output is now forwarded to audio/video signal processing circuit 60. This circuitry may include a descrambling capability. Baseband audio output 66 and baseband video output 68 from processing circuit 60 are supplied to RF modulator 62 which provides at its output a standard television signal 64. Signal 64 usually corresponds to channel three or four, for connection to a television's RF input (e.g. antenna terminals). Alternatively, baseband outputs 66 and 68 may be connected directly to a television's baseband input terminals. Since output signals 64, 66, and 68 will ultimately provide signaling to a television screen, the user interface and programming for this embodiment is the same as that described above for FIG. 1A.

FIGS. 3A–3J are flow charts depicting microprocessor programming and how it relates to the on-screen programming screens, and user inputs. FIG. 3A is the main loop of the microprocessor program and is initiated upon the device being turned on. Here the microprocessor will monitor the selected channel for validity. If the selected channel becomes invalid, the microprocessor will change channels to receive a valid channel (if one exists at this time). If a valid channel does not exist at this time, the microprocessor will display the channel disabled screen (FIG. 2P) for the selected channel as described above. Additionally the microprocessor will monitor the discrete schedule portion of the channel viewing matrix for transpired events. Once a discrete event has transpired, the microprocessor will automatically clear the memory locations for the transpired event. In this manner the user is not required to go back and "cleanup" the discrete schedule once the associated events have passed. The microprocessor also monitors user inputs for channel changes and password entry. Upon receiving a user input to change channels, the microprocessor will compare the channel viewing matrix for the desired channel against the current time and day or date. If the desired channel is valid, the microprocessor will change the programmable constant in the oscillator to reflect the user entry and hence change to the desired channel. If the desired channel is invalid, the microprocessor will display the channel disabled screen (with respect to the invalid channel) for a few moments and will then revert back to the original valid channel. Again, the channel disabled screen is depicted in FIG. 2P and contains the current days channel viewing matrix for the selected channel. Once the user inputs a valid password, the microprocessor will display the main menu on the television screen. The main menu screen is depicted by FIG. 2A and the associated flow chart is FIG. 3B. Note that the current status displayed in FIG. 2A are for all channels "not disabled", enabled weekly schedule, and enabled discrete schedule. These status are indicated by check-marks in the applicable status boxes and will vary depending on user inputs. The various selections of the main menu can be chosen by pressing the "up" or "down" arrow keys of the keyboard or remote control until the desired selection is highlighted. Once the desired selection is highlighted, the user then presses the "enter" key on the keyboard or remote control to execute the selection. Unless stated otherwise, all menu screen selections are made by pressing the "up", "down", "left" or "right" arrow keys on the keyboard or remote control until the desired selection is highlighted, and then pressing "enter". The specific menu screens that are displayed will depend on user selections and will be discussed in the following paragraphs. Again, FIG. 2Q illustrates a menu tree that depicts the relationships between the various programming screens. Flow chart references to specific programming screens are indicated by the underlined title of the applicable menu screen(s), and by their figure number.

Figures 3C, 3D:
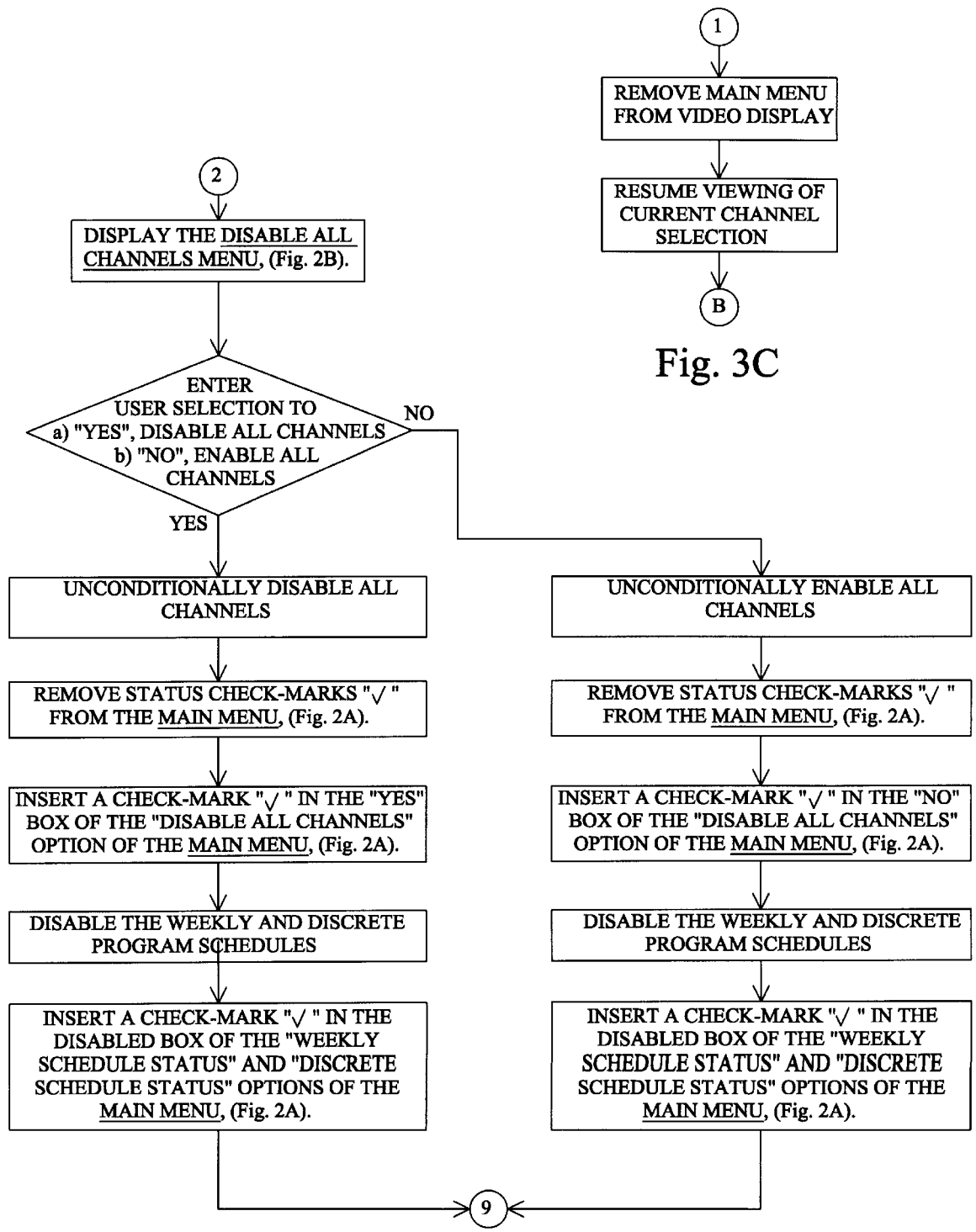
Figures 1, 3E:
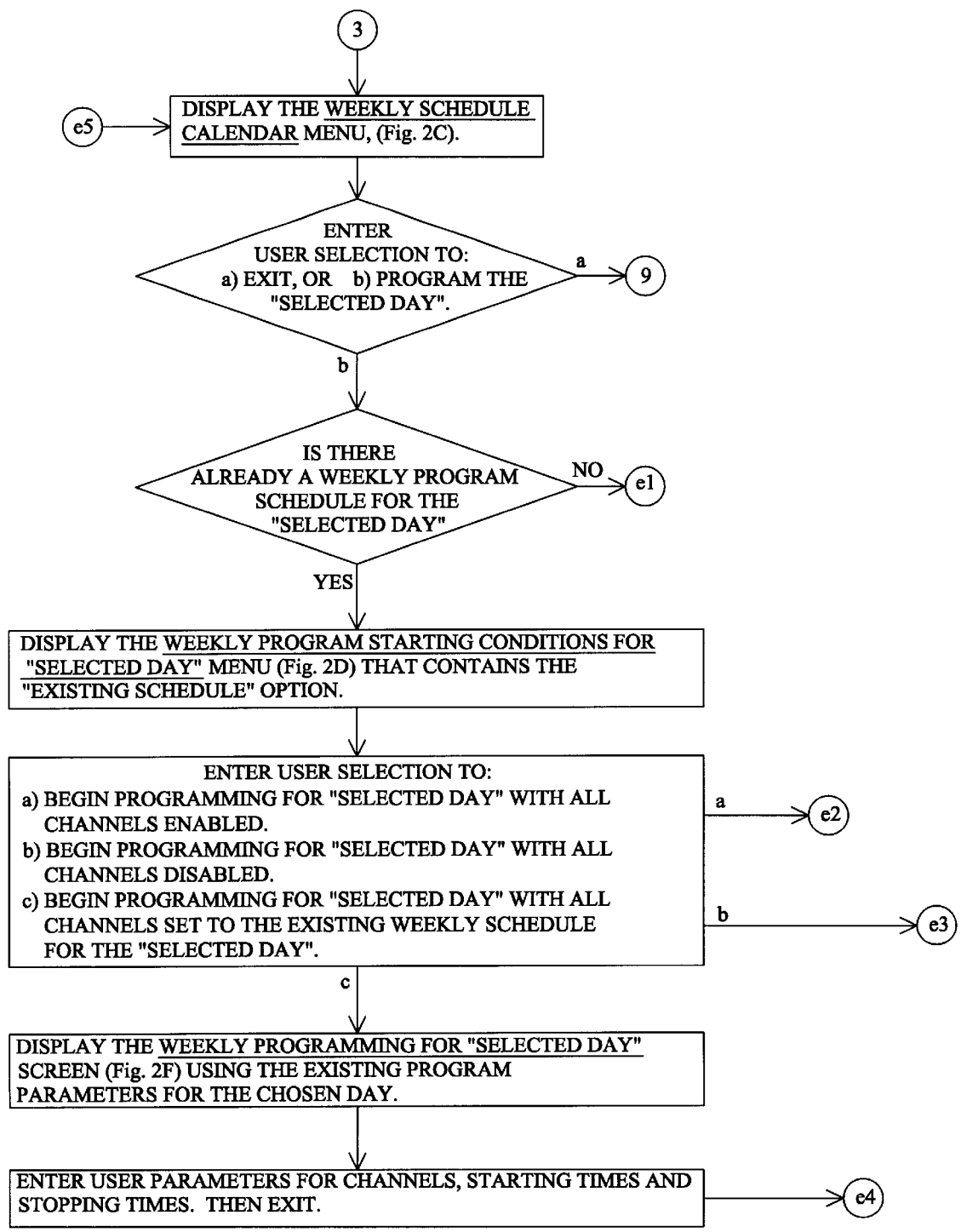

The first selection on the main menu (FIG. 2A) is "Exit". Selecting "Exit" from the main menu will not display any further menu screens but will instead return the user to television viewing. Likewise the microprocessor will revert back to the main loop as detailed in FIG. 3A. The associated flow chart for the "Exit" main menu selection is depicted in FIG. 3C.

The second selection on the main menu (FIG. 2A) is "Disable All Channels". Selecting the "Disable All Channels" option from the main menu will cause the microprocessor to display the disable all channel screen, FIG. 2B. Here the user can make the selection to unconditionally disable all channels for an indeterminate period of time (i.e. until the opposite selection is made.). The associated flow chart for this main menu selection is FIG. 3D. Notice that selecting to either enable or disable this feature will result in both the weekly and discrete schedules being disabled.

Figures 2, 3E:
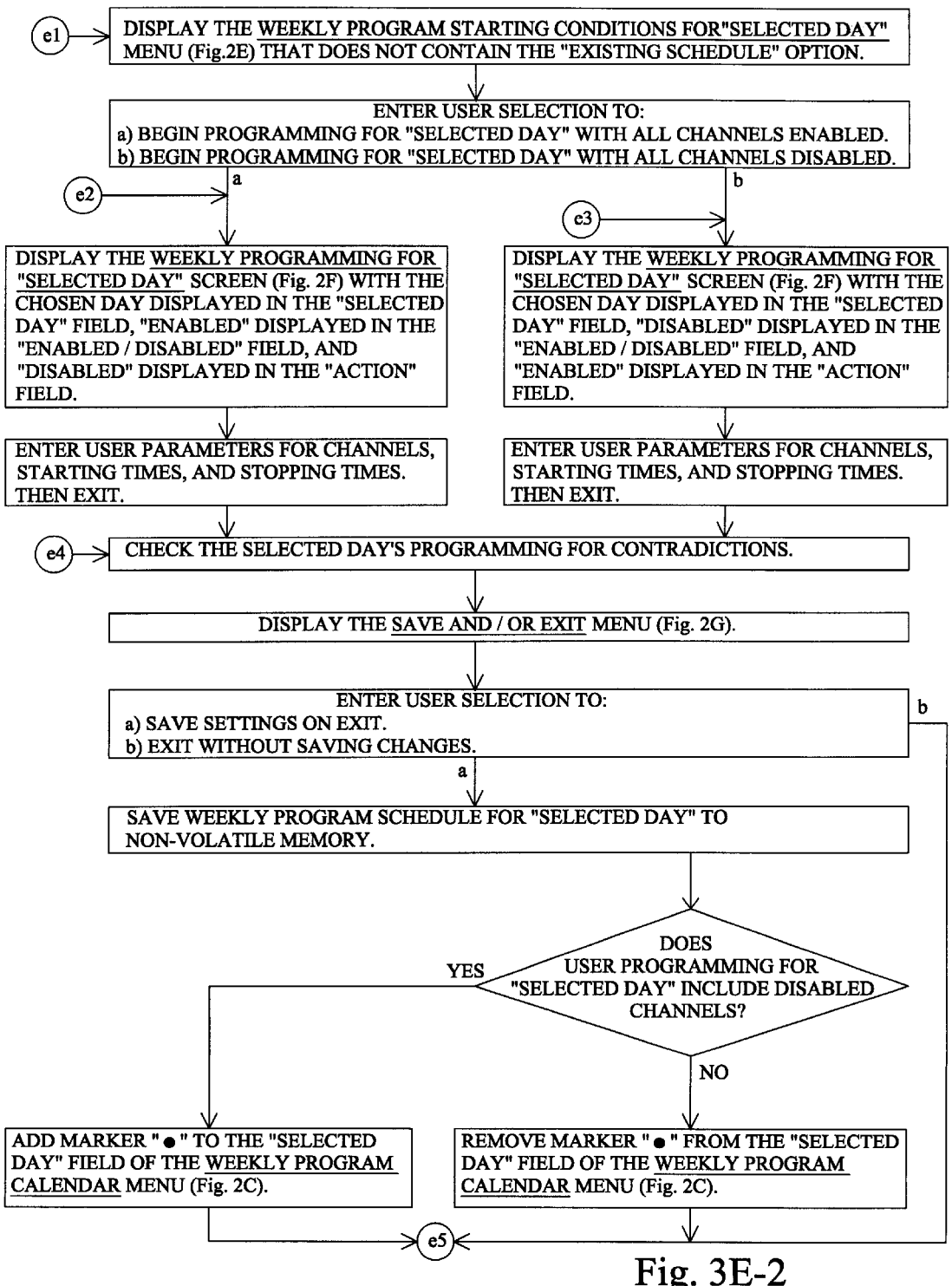
Figure 3F:
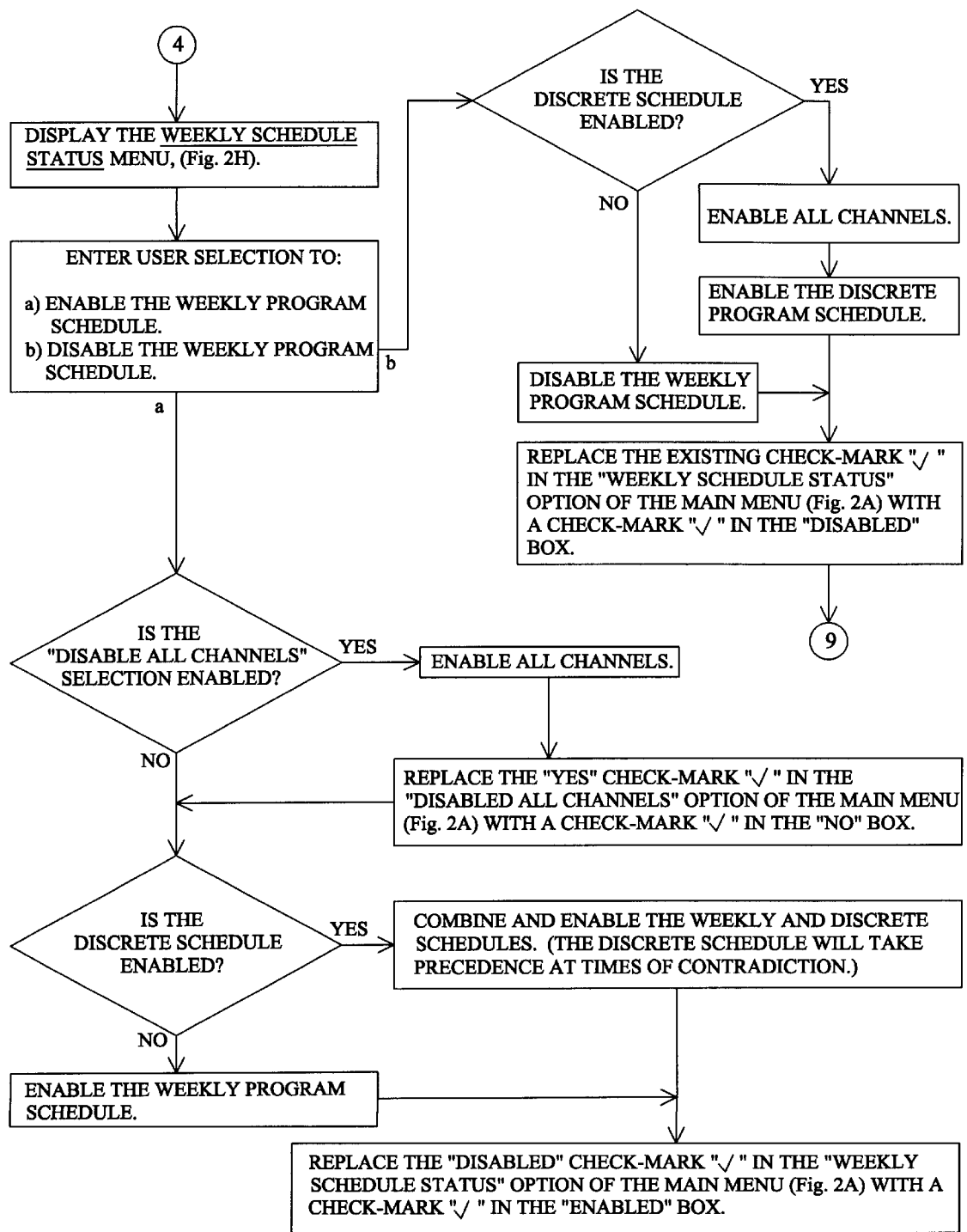
Figures 1, 3G:
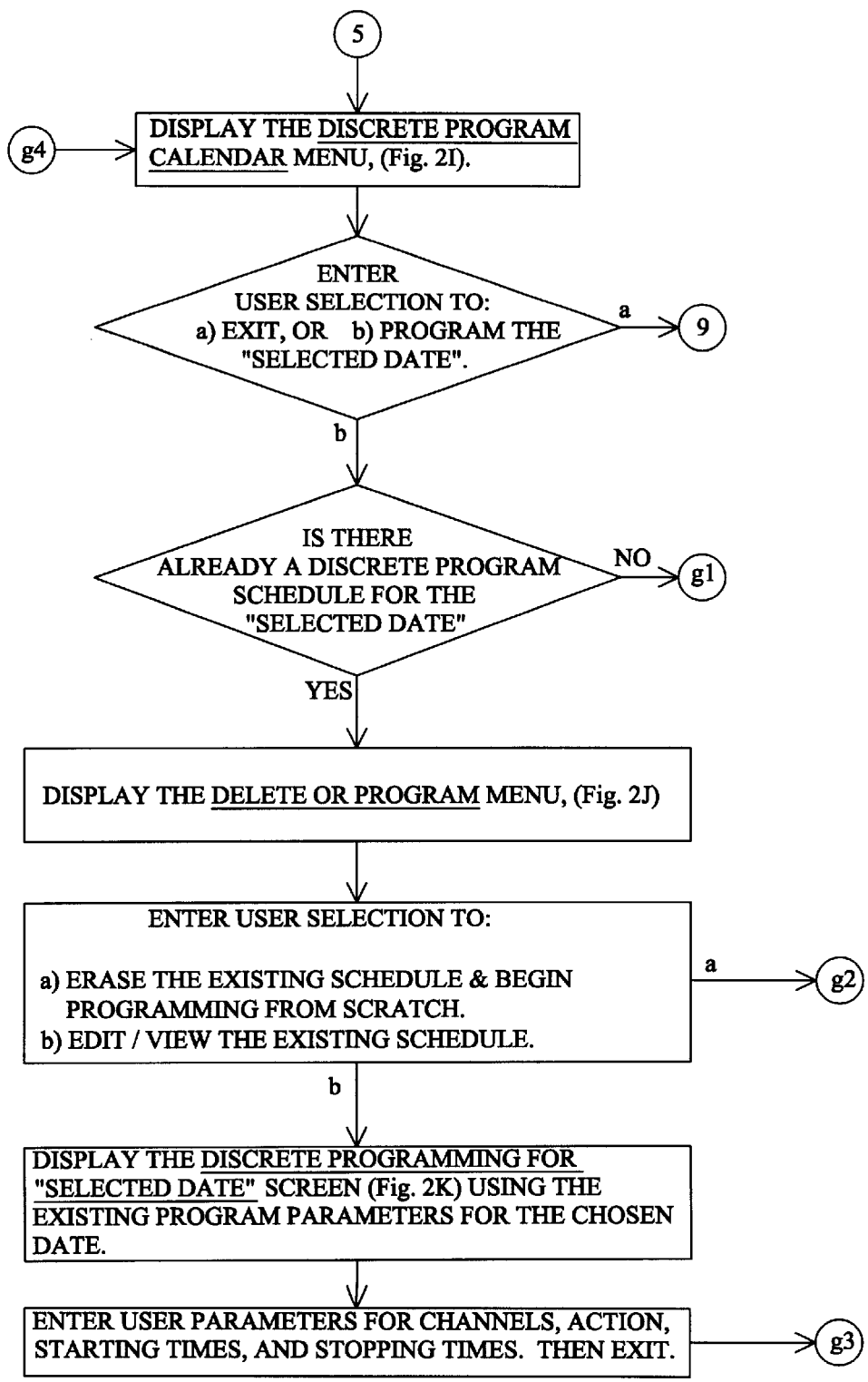
Figures 2, 3G:
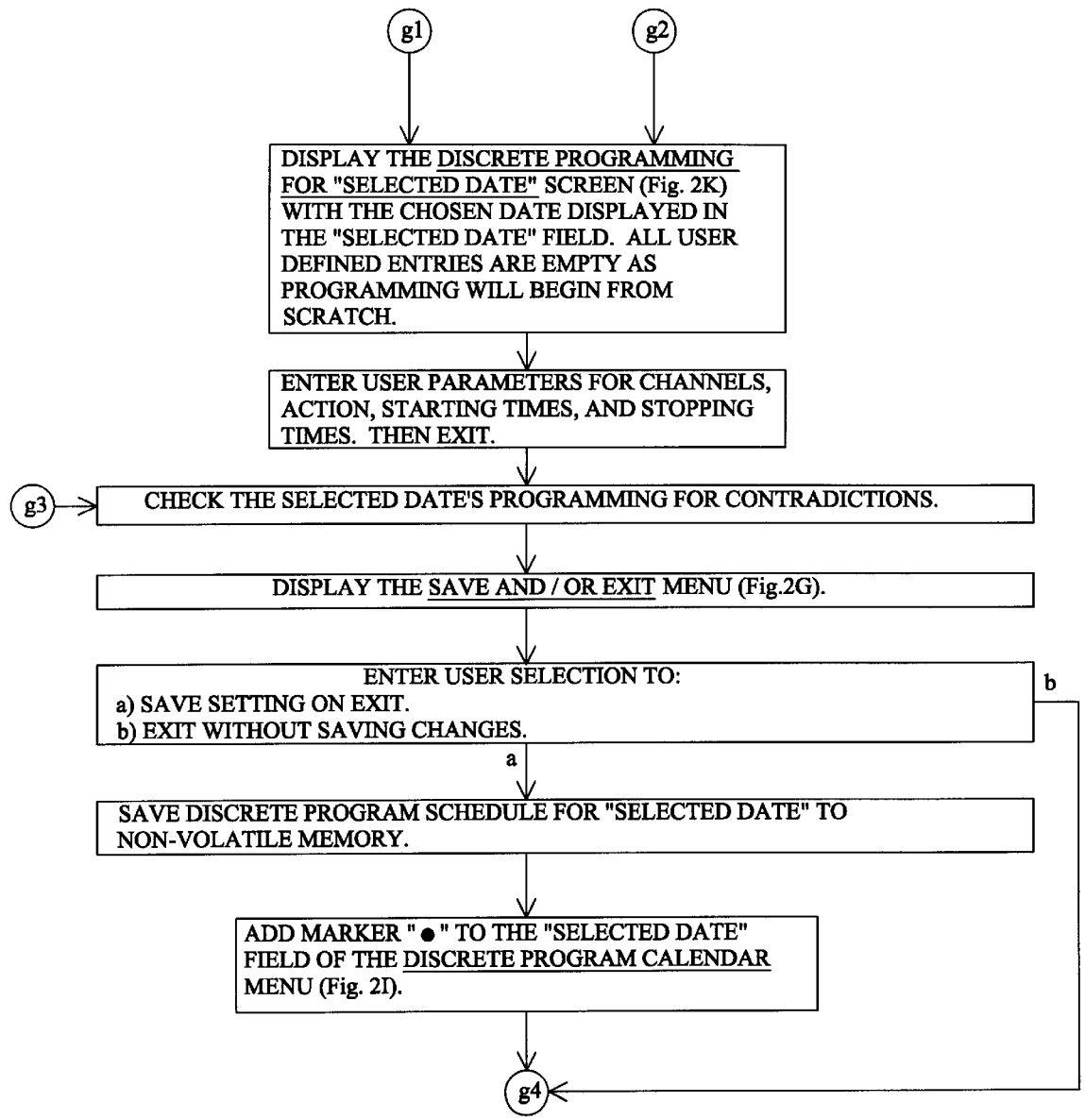
Figure 3H:
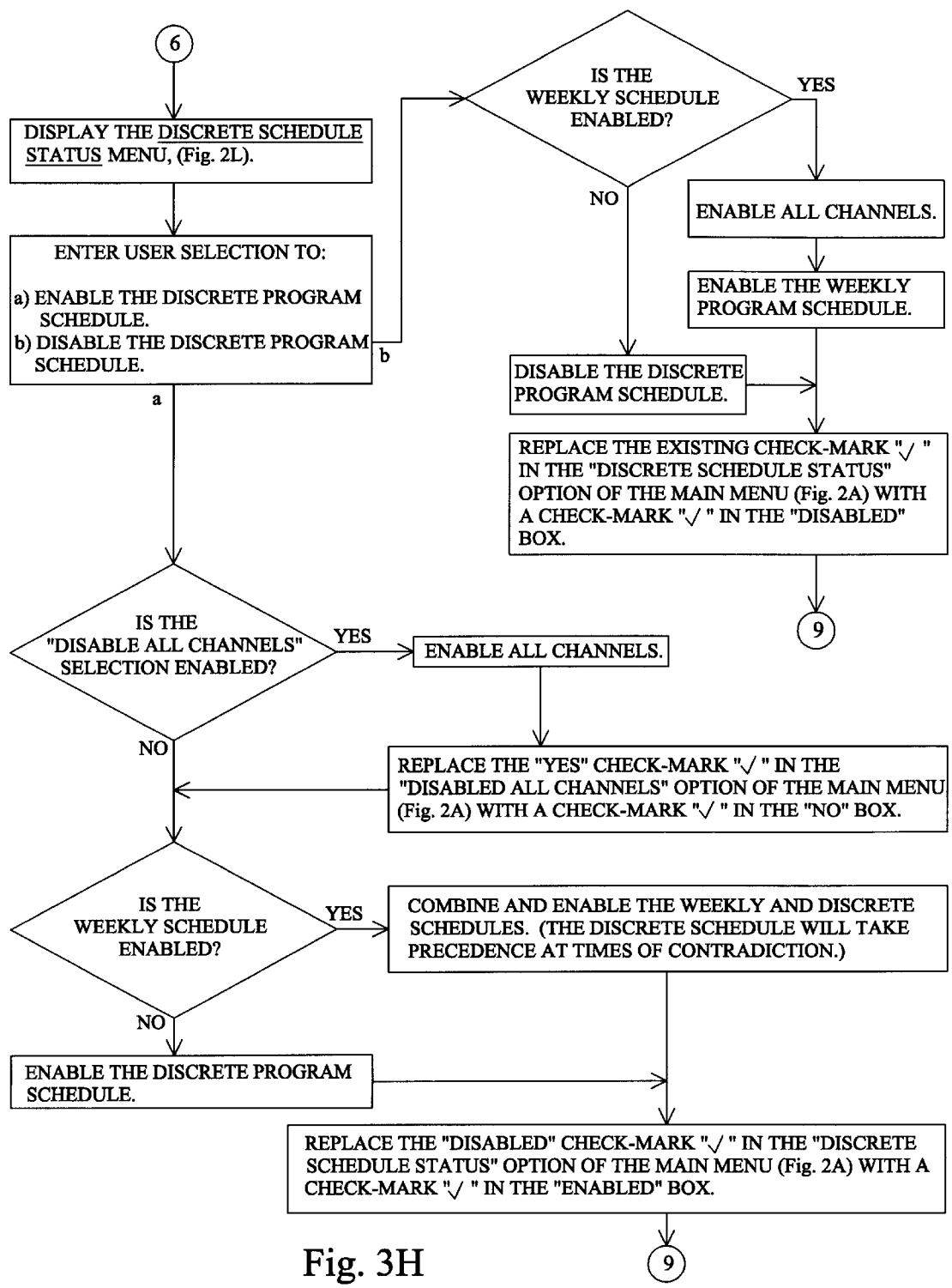
Figure 3I:
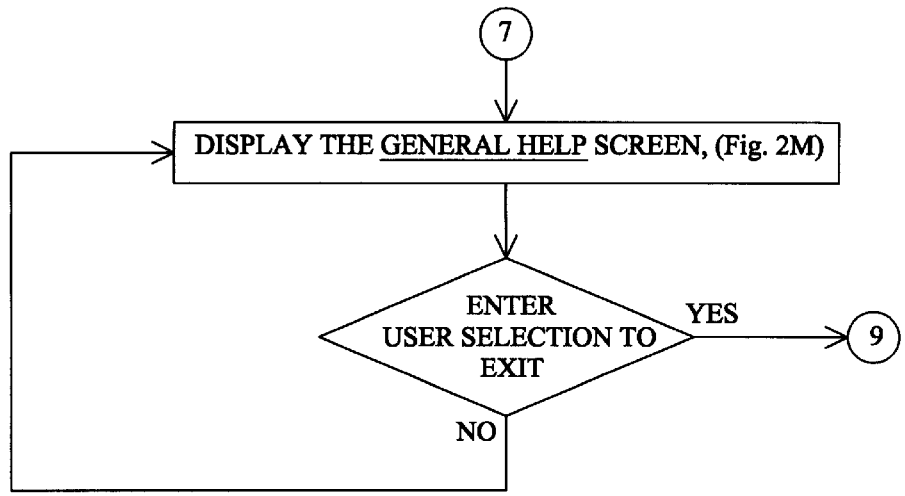
Figure 3J:
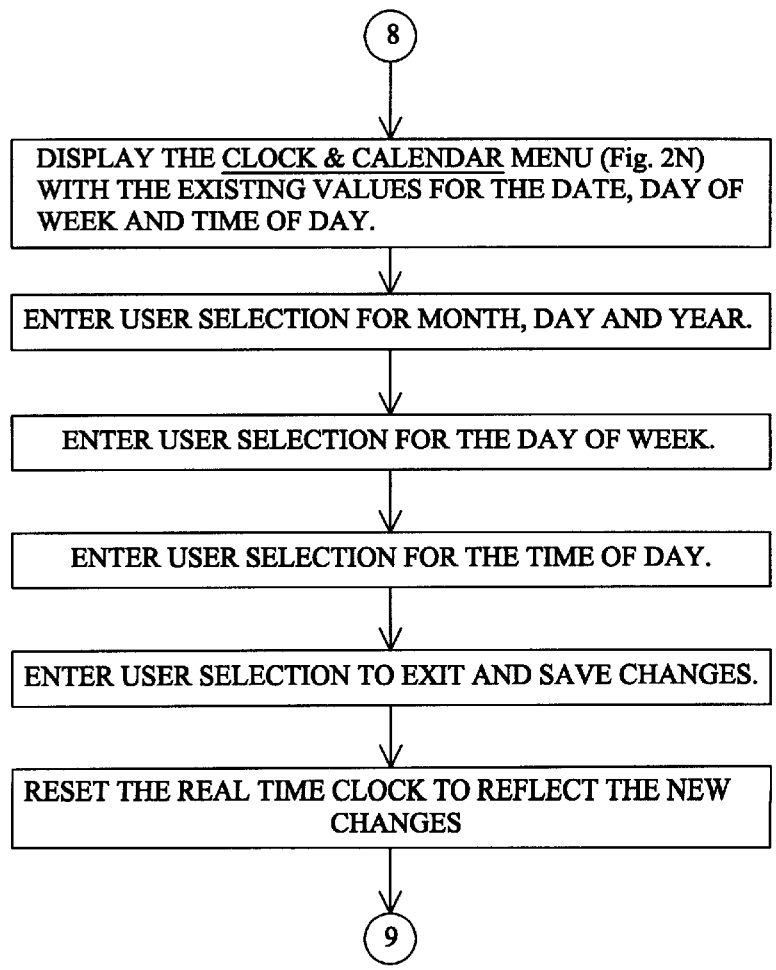

The third selection on the main menu (FIG. 2A) is "Edit/View Weekly Program Schedule". Selecting the "Edit/View Weekly Program Schedule" option from the main menu will cause the microprocessor to display the weekly program calendar, FIG. 2C. Notice how the weekly program calendar displays a top-level view of the weekly program schedule. Here the user will begin viewing and or programming the weekly program schedule by selecting the day of week to view and or program. The associated flow chart for this main menu selection is FIGS. 3E-1 & 3E-2. Notice in FIG. 2C that days of the week with a "●" indicate days that already have existing programming. Since the default is to have all channels enabled, existing programming is defined as having one or more channels disabled for the associated day of the week. The microprocessor will display FIG. 2D if a day of the week was chosen that has existing programming, or FIG. 2E if a day of the week was chosen that does not have existing programming. At this point the user can exit and return to the weekly program calendar (FIG. 2C), or can make one of three programming choices. First, the user can choose to begin programming the selected day with all channels disabled. In this scenario the weekly programming for "selected day" screen (FIG. 2F) is then displayed with the above chosen day of the week in place of the "selected day" portion of the title and "disabled" in place of the "enabled/disabled" portion of the text located just below the title. The user can now use the arrow keys to highlight the appropriate box for programming. As an example, the user can highlight the top left box and then use the "+", "−" or "0–9" keys to indicate the desired channel to enable. At this point the word "enable" is automatically placed in the "action" column for this channel. Likewise, the user can now enter the time of day for this channel to be enabled by defining the starting time and ending time. Following this procedure, the user can define one or more times for this same channel or other channels to be enabled. If the user makes a programming entry that is not desired, the user can simply go back to the applicable field an re-enter new information. Similarly the user can highlight a box and press the "delete" key on the keyboard or remote control to erase the programming information for the selected field. The second programming choice the user can make from FIG. 2D or 2E is to begin programming the selected day with all channels enabled. In this scenario, FIG. 2F is then displayed with the above chosen day of the week in place of the "selected day" portion of the title and "enabled" in place of the "enabled/disabled" portion of the text located just below the title. The user can now use the keyboard or remote control to highlight and program the appropriate boxes as in the above example. Likewise, in this second scenario, "disabled" is automatically displayed in the action column of FIG. 2F. The third programming choice that can only be made from FIG. 2D is to begin programming the selected day using the existing programming information for the selected day. In this third scenario, FIG. 2F is again displayed with the above chosen day of the week in place of the "selected day" portion of the title. However, the "enabled/disabled" and "action" variables of FIG. 2F, and the channels, start times, and ending times will assume the values of the existing program information for the selected day of the week. The user can now use the keyboard or remote control to highlight and program the appropriate boxes as in the above examples. Once the user has completed programming the weekly programming for "selected day" screen (FIG. 2F), the user then selects "Exit". At this point the microprocessor will display the save and/or exit screen, FIG. 2G. Here the user makes the selection to save the programming changes for the selected day of the week upon exiting, or to not save the programming changes for the selected day of the week upon exiting. Once the user has made their selection, the microprocessor will again display the weekly program calendar, FIG. 2C. Here the user can repeat the above programming steps for a different day of the week or the user can choose to exit and return to the main menu.

The fourth selection on the main menu (FIG. 2A) is "Weekly Schedule Status". Selecting the "Weekly Schedule Status" option from the main menu will cause the microprocessor to display the weekly schedule status screen, FIG. 2H. The associated flow chart for this main menu selection is detailed in FIG. 3F. Here the user can change the state of the weekly schedule status by making the appropriate selection via the keyboard or remote control. Note that if the main menu selection to disable all channels was made, enabling the weekly schedule will "de-select" this option. Also, if the discrete schedule is enabled, it will take precedence if there are any contradictions between the weekly and discrete schedule programming. As an example, if the weekly schedule has channel #12 enabled from 8 am to noon, and the discrete schedule has channel #12 disabled from 10 am to noon (both on the same day/date); then the viewer will only be able to watch channel #12 from 8 am to 10 am.

The fifth selection on the main menu (FIG. 2A) is "Edit/View Discrete Program Schedule". Selecting the "Edit/View Discrete Program Schedule" option from the main menu will cause the microprocessor to display the discrete program calendar, FIG. 2I, with the current month and year displayed in the title bar. Notice how the discrete program calendar displays a top-level view of the discrete program schedule. Here the user will begin viewing and or programming the discrete program schedule by selecting a day of a month (date) to view and or program. The associated flow chart for this main menu selection is detailed in FIGS. 3G-1 & 3G-2. The left, right, up, & down arrow keys are used to select a date to program. Movement beyond the edge of the program screen will change the calendar to the next applicable month. Notice in FIG. 2I that days of a month with a "●" indicate days that already have existing programming. Here, existing programming is defined as having one or more channels enabled or disabled for the associated date. The microprocessor will display FIG. 2J if a day was chosen that has existing programming. At this point the user can exit and return to the discrete program calendar (FIG. 2I), or can make one of two programming choices. First, the user can choose to begin programming by editing/viewing the existing schedule for the selected date, or by deleting the existing schedule for the selected date and to begin programming from scratch. Once a programming selection has been made, the discrete programming for "selected date" screen (FIG. 2K) is then displayed with the above chosen date in place of the "selected date" portion of the title. If the option was chosen to edit/view the existing schedule, then the discrete programming for "selected date" screen (FIG. 2K) will be displayed with the existing program information. The user can now use the arrow keys to highlight the appropriate box for programming. As an example, the user can highlight the top left box and then use the "+", "−" or "0–9", and "enter" keys to indicate the desired channel to enable or disable. At this point the user will be prompted to define this as a channel to enable or disable in the "action" column. This is accomplished by pressing the "+" or "−" keys on the keyboard or remote control to toggle the field until the desired action is obtained. The user can now enter the time of day for this channel to be enabled/disabled by defining the starting time and ending time. Following this procedure, the user can define one or more times for this same channel or other channels to be enabled/disabled. If the user makes a programming entry in screen FIG. 2K that is not desired, the user can simply go back to the applicable field an re-enter new information. Similarly the user can highlight a box and press the "delete" key on the keyboard or remote control to erase the programming information for the selected field. Alternatively, if a date was chosen from the discrete program calendar that does not have existing programming, the user is forwarded directly to discrete programming for "selected date" screen (FIG. 2K). The user can now use the keyboard or remote control to highlight and program the appropriate boxes as in the above scenario. Once the user has completed programming the discrete programming for "selected date" screen (FIG. 2K), the user then selects "Exit". At this point the microprocessor will display the save and/or exit screen, FIG. 2G. Here the user makes the selection to save the programming changes for the selected date upon exiting, or to not save the programming changes for the selected date upon exiting. Once the user has made their selection, the microprocessor will again display the discrete program calendar, FIG. 2I. Here the user can repeat the above programming steps for a different date or the user can choose to exit and return to the main menu.

The sixth selection on the main menu (FIG. 2A) is "Discrete Schedule Status". Selecting the "Discrete Schedule Status" option from the main menu will cause the microprocessor to display the discrete schedule status screen, FIG. 2L. The associated flow chart for this main menu selection is detailed in FIG. 3H. Here the user can change the state of the discrete schedule status by making the appropriate selection via the keyboard or remote control. Note that if the main menu selection to disable all channels was made, enabling the discrete schedule will "de-select" this option. Also, if the weekly schedule is enabled, it will be over-ridden by the discrete schedule if there are any contradictions between the weekly and discrete schedule programming. As an example, if the discrete schedule has channel #47 enabled from 10 am to noon and the weekly schedule has channel #47 disabled from 7 am to 1 pm (both on the same day/date); then the viewer will be able to watch channel #47 from 10 am to noon.

The seventh selection on the main menu (FIG. 2A) is "Help". Selecting the "Help" option from the main menu will cause the microprocessor to display the help screen, FIG. 2M. Here the user can view the help screen for needed information, and can then exit by pressing the "enter" key. The associated flow chart for this main menu selection is detailed in FIG. 3I.

The eighth and last selection on the main menu (FIG. 2A) is "Set Clock & Calendar". Selecting the "Set Clock & Calendar" option from the main menu will cause the microprocessor to display the clock & calendar screen, FIG. 2N. Here the user can reset the date and time and will be returned to the main menu upon exiting. The flow chart associated with this main menu selection is detailed in FIG. 3J.

SUMMARY, RAMIFICATIONS, AND SCOPE

Accordingly, the reader will see that the channel control feature of this invention can be programmed to either restrict or permit viewing of specific television shows by simply entering the channel(s) and show time(s) of the respective program(s) into the channel viewing matrix. Accordingly, the channel viewing matrix can be programmed for weekly repetitive television shows and/or for single non-repetitive events. Likewise, the channel viewing matrix can be programmed to enable or disable all channels for an indeterminate period of time. A unique feature of this invention is that a precise sequence of television shows can be viewed by only allowing one valid channel at any given time. This is because the microprocessor will automatically change to a valid channel if the current channel becomes invalid. Furthermore, the programmable channel controller has the additional advantages in that

- it is simple and inexpensive to manufacture by virtue of modifying contemporary receiver design as little as possible and by adding the fewest number of additional circuit components;
- it has a universal application in that it can be embodied in a television set, video cassette recorder (VCR), cable television (CATV) box, satellite receiver, or as a stand alone unit;
- it cannot be defeated if external power is interrupted;
- it does not require an external support group or system;
- it is easy to use and leads the user through the programming steps in a logical manner; and
- it can block and or limit the use of video games and video cassette recorders.

Although the description above contains many specificities, these should not be construed as limiting the scope of the invention but as merely providing illustrations of some of the presently preferred embodiments of this invention. For example, this invention could be embodied in a radio in order to limit/control the usage of a radio, the invention may incorporate descrambling capabilities, the on-screen programming can be minimized or eliminated by incorporating a more sophisticated keypad, the invention could be implemented by a personal computer either in conjunction with a television or with the computer monitor and a TV receiver computer card, signal source 28 could be derived from an integrated services digital network (ISDN), the discrete schedule option could be eliminated, a key or combination lock could be used for security access, etc. . . .

While a preferred embodiment of the present invention has been disclosed and described in detail, and various alternate embodiments have been described, it will be understood by those skilled in the art that various changes in form and detail may be made to the present invention without departing from the spirit and scope of the invention. Thus the scope of the invention should be determined by the appended claims and their legal equivalents, rather than by the examples given.

What is claimed is:

1. A receiver which is tunable to any of a plurality of modulated carrier signals, said receiver comprising a tuner local oscillator the frequency of which is determined by a control circuit responsive to a user input indicating the selection of a modulated carrier signal to which the receiver should tune, and a non-volatile memory connected to said control circuit for storing information, and a real time clock connected to said control circuit for providing current time, said control circuit being responsive to a user entered channel viewing matrix which is stored in said non-volatile memory and is compared to information provided by said real time clock, said user entered channel viewing matrix defining times of certain channels of which said control circuit will be prohibited from allowing said receiver to tune, said control circuit comprising a control means for automatically changing channels to the next valid channel if the current channel is or becomes invalid, and a data entry means for entering information into said user entered channel viewing matrix, whereby said receiver will only allow viewing of television programs as defined in said user entered channel viewing matrix.

2. A receiver as recited in claim 1 further comprising a memory management means for automatically clearing the memory locations of non-repetitive programming that has become obsolete, whereby the user is not required to clean-up memory locations, and whereby user editing is simplified by the non-repetitive schedule only containing valid data.

3. A channel viewing matrix as recited in claim 1 further comprising repetitive, and non-repetitive schedules which are edited substantially separate from each other, whereby the respective data is not co-mingled in a manner confusing to the user.

4. A channel viewing matrix as recited in claim 1 further comprising a conflict detection means for determining and correcting a programming contradiction between repetitive and non-repetitive programming schedules, whereby the user is not required to anticipate and correct a programming conflict.

5. A channel viewing matrix as recited in claim 1 further comprising the option to begin editing with either all channels disabled, or all channels enabled, whereby data entry is minimized.

6. A channel viewing matrix as recited in claim 1 further comprising a program calendar, whereby a top-level view of said channel viewing matrix contents an be easily acquired.

7. A receiver as recited in claim 1 further comprising a channel disabled screen which contains the contents of said channel viewing matrix, whereby the viewer can determine when the invalid channel will become available.

8. A method for supervising video viewing comprising the steps of:
   (a) displaying a menu system for enabling a user to program a user entered channel viewing matrix:
   (b) programming said user entered channel viewing matrix for specific times of channels which are to be prohibited from viewing:
   (c) monitoring channel usage to ensure that prohibited channels as defined in said channel viewing matrix will not be viewed:
   (d) changing channels to the next valid channel if the current channel is or becomes invalid.

9. The method of claim 8 wherein said step of displaying further includes the display of a program calendar, whereby a top-level view of the channel viewing matrix can be quickly obtained.

10. The step of claim 8 wherein said step of programming repetitive and non-repetitive schedules further consists of editing and viewing the repetitive and non-repetitive schedules substantially independently from each other, whereby the respective data is not co-mingled in a manner confusing to the user.

11. The method of claim 8 wherein said step of programming further includes the ability to begin programming with either all channels disabled, or with all channels enabled, whereby data entry is minimized.

12. The method of claim 8 wherein said step of monitoring further includes the clearing of memory locations of non-repetitive programming that has become obsolete, whereby memory requirements are minimized.

13. The method of claim 8 wherein said step of monitoring further includes detection and correction of a programming contradiction, whereby the user is not required to anticipate and correct a programming conflict.

14. The method of claim 8 wherein said step of monitoring and said step of displaying further includes the display of a channel disabled screen upon detection of an invalid channel, said screen further including the contents of said channel viewing matrix, whereby the viewer can determine when the invalid channel will become available.

* * * * *